(12) United States Patent
Greiner

(10) Patent No.: US 6,908,205 B2
(45) Date of Patent: Jun. 21, 2005

(54) LIGHTING DEVICE WITH LINEAR LIGHT SOURCES

(75) Inventor: Horst Greiner, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/833,734

(22) Filed: Apr. 28, 2004

(65) Prior Publication Data

US 2004/0202441 A1 Oct. 14, 2004

Related U.S. Application Data

(63) Continuation of application No. 10/050,259, filed on Jan. 16, 2002.

(30) Foreign Application Priority Data

Jan. 20, 2001 (DE) .......................................... 101 02 587

(51) Int. Cl.⁷ ................................................ F21V 7/04
(52) U.S. Cl. ........................... 362/31; 362/27; 362/223; 362/307
(58) Field of Search .............................. 362/31, 26, 27, 362/29, 30, 223, 224, 307, 330, 339; 349/65, 67

(56) References Cited

U.S. PATENT DOCUMENTS

| 6,295,105 B1 | * | 9/2001 | Lee et al. ..................... 349/65 |
| 6,412,969 B1 | * | 7/2002 | Torihara et al. .............. 362/31 |
| 2001/0043294 A1 | * | 11/2001 | Bechtel et al. ................ 349/71 |
| 2002/0001184 A1 | * | 1/2002 | Kim et al. .................... 362/27 |

FOREIGN PATENT DOCUMENTS

JP          527238          5/1993 ......... G02F/1/1335

* cited by examiner

*Primary Examiner*—Sandra O'Shea
*Assistant Examiner*—Mark Tsidulko

(57) ABSTRACT

A lighting device is described with an optical waveguide plate that has a light emission surface and a plurality of channels each with at least one substantially linear light source. The device is suitable in particular for use as a backlight in a liquid crystal display, such as an LCD picture screen, or for use as a planar light source. The channels are provided with a reflecting first layer at their upper sides facing the light emission surface. The coupling of light into the optical waveguide plate takes place through side walls of the channels.

20 Claims, 1 Drawing Sheet

LIGHTING DEVICE WITH LINEAR LIGHT SOURCES

This application is a continuation of application Ser. No. 10/050,259, filed Jan. 16, 2002.

The invention relates to a lighting device with an optical waveguide plate which comprises a light emission surface and a plurality of channels for accommodating each at least one substantially linear light source, said device being designed in particular for use as a backlight in liquid crystal displays such as LCD picture screens or for use as a planar light radiator.

It is known that LCD picture screens require a backlighting of their entire surface area which is as homogeneous as possible for rendering a picture visible. The difficulty often arises, however, in particular in the case of large lighting devices, that a high luminous intensity cannot be generated with sufficient homogeneity on the entire light emission surface in front of which the picture screen is positioned. This may lead to unpleasant picture effects. Furthermore, these lighting devices should have as small a thickness as possible in many cases.

In principle, two kinds of these lighting devices are distinguished. In the case of so-called direct-lit devices such as known, for example, from JP-5-27238, the light sources, which are usually cylindrical cold- or hot-cathode lamps, are arranged directly behind the picture screen in the optical waveguide plate. The lighting device is then provided with a reflecting layer on its side facing away from the picture screen. To achieve an illumination of the picture screen which is as homogeneous as possible, the distance between the light sources on the one hand and the picture screen on the other hand must not be too small, because otherwise the light radiated directly onto the picture screen by the lamps cannot be compensated for. A comparatively homogeneous light distribution over the picture screen, however, can also be achieved by means of light-scattering layers in front of the picture screen. This requires in general a constructional depth which is more than twice the lamp diameter. A further disadvantage follows from the fact that the light-scattering layers lead to losses, so that the efficiency of such backlight systems (i.e. the proportion of the light generated by the light sources which is actually available for illuminating an LCD picture screen) is at most approximately 50%.

In the case of indirect or side-lit backlighting systems as known, for example, from EP-0717236, the light sources are present at the lateral (narrow) sides of an optical waveguide plate. The light enters the optical waveguide plate through these lateral surfaces and is propagated therein through total reflection against the lateral surfaces of the plate. The light is subsequently coupled out towards the picture screen by means of suitable extraction elements arranged at the front or rear side of the plate. The advantages of this arrangement are that the constructional depth is smaller and that the illumination is usually more homogeneous than in the case of a direct-lit system. The disadvantages are, however, that the total quantity of light is comparatively limited because only the four lateral surfaces are available for introducing the light. In this case, too, it is difficult to achieve a homogeneous illumination through suitable dimensioning of the emission (coupling-out) structures, in particular in the case of larger plates.

It is accordingly an object of the invention to provide a lighting system of the kind mentioned in the opening paragraph which is suitable in particular for use as a backlight for large LCD picture screens and which makes available a homogenous and intensive illumination of the picture screen in combination with a small constructional depth.

According to claim 1, this object is achieved by means of a lighting device with an optical waveguide plate which comprises a light emission surface and a plurality of channels for accommodating each at least one substantially linear light source, and which is characterized in that said channels are covered with a first reflecting layer at their upper sides facing the light emission surface, and the coupling of the light into the optical waveguide plate takes place through side walls of the channels.

This solution combines the advantages of direct and indirect backlighting systems and accordingly makes available a higher luminous intensity in combination with a homogeneous distribution and a high efficiency of the light sources used. On the one hand, the constructional depth need not be greater than in known indirect backlight systems, because the light sources can be incorporated into the plate. Very flat lighting devices can accordingly be manufactured whose constructional depth does not exceed twice the lamp diameter, i.e. approximately 6 to 8 mm.

On the other hand, an at least equally high luminous intensity can be achieved at the light emission surface as in the case of direct-lit systems, because the number of the light sources is not limited by the number of lateral surfaces. A desired luminous intensity may be achieved through a suitable choice of the number of light sources or channels.

The dependent claims relate to advantageous further embodiments of the invention. A particularly high homogeneity of the light on the light emission surface is achieved in the embodiments as claimed in claims 2 and 10 to 12, because it is impossible for any portion of the light issuing from the light sources to reach the light emission surface directly.

The efficiency of the light sources is further enhanced with the embodiments as claimed in claims 3, 8, and 9, while the embodiments as claimed in claims 4 to 6 are particularly easy to manufacture.

Further particulars, features, and advantages of the invention will become apparent from the ensuing description of preferred embodiments which is given with reference to the drawing, in which.

Figure 1:
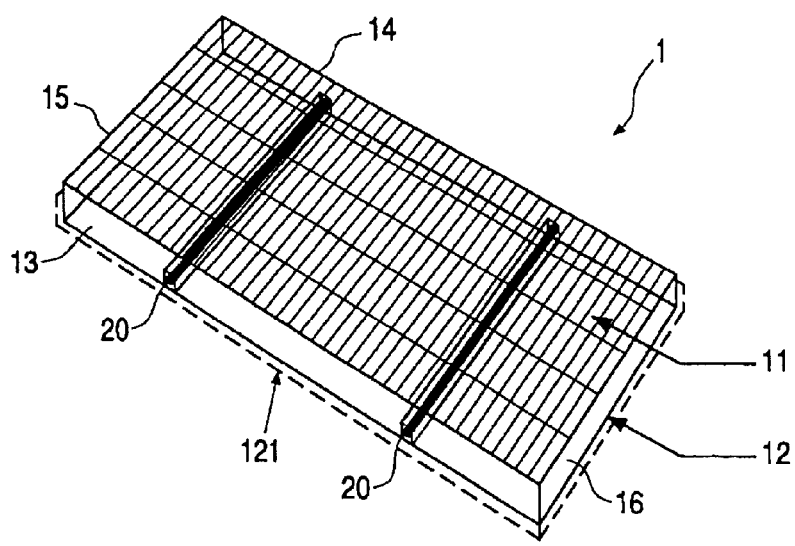
FIG. 1 is a perspective view of a first embodiment of the lighting device.

FIG. 1 shows a rectangular optical waveguide plate 1 which is manufactured in a known manner from a material transparent to light. At its upper side the plate comprises a light emission surface 11 from which the light is coupled out in a known manner, and opposite thereto a lower side 12, as well as two long lateral surfaces 13, 14 and two short lateral surfaces 15, 16. A plurality of channels 20 are provided in the lower side of the plate 1, which channels extend substantially parallel to the short lateral surfaces and over the entire width of the optical waveguide plate 1.

The number and mutual distance of the channels may have any values in principle and may be chosen in dependence on the size of the lighting device, the desired luminous intensity at the light emission surface, and the nature of the light sources. To achieve a homogeneous light distribution, the channels are distributed as evenly as possible over the optical waveguide plate 1.

The optical waveguide plate 1 and in particular its light emission surface 11 need not necessarily be rectangular. Alternative shapes such as, for example, quadratic, round, or oval shapes, etc., are also possible. Furthermore, the channels in the plate may follow any course in principle. Besides the preferred arrangement parallel to a long or short side of the optical waveguide plate, a course along the main diagonals of the plate is alternatively possible. This course may be advantageous in particular for an application in monitors. In addition, the channels may also be circular, oval, meandering, etc., in the plate. Finally, the beginning and end of each channel may alternatively lie in the plate.

Figure 2:
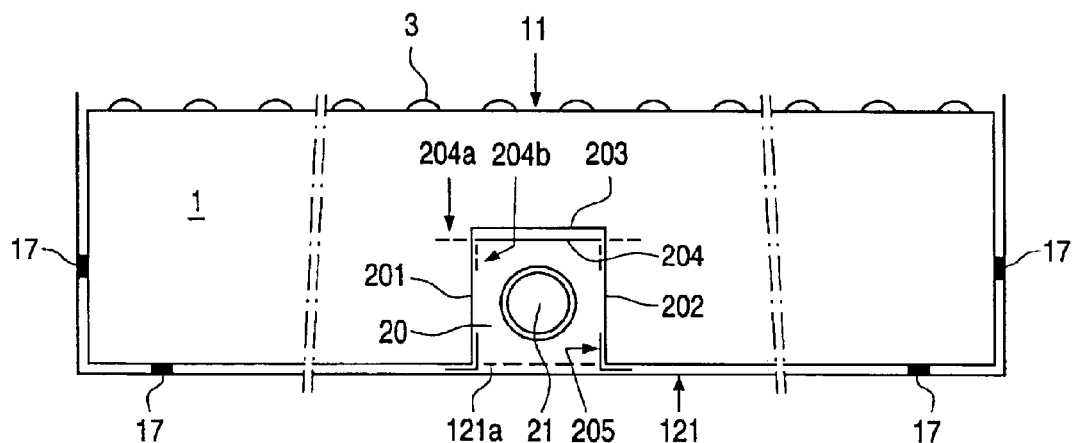
FIG. 2 is a side elevation of the lighting device of FIG. 1.

FIG. 2 is a side elevation of part of the long lateral surfaces 13, 14 in the region of one of the channels 20. Inside the channel there is a light source 21 which may be, for example, a low-pressure gas discharge lamp and which extends substantially over the entire length of the channel 20, which is empty apart from the lamp. As is apparent from this Figure, the channel has side walls 201, 202 which extend substantially perpendicularly to the light emission surface 11, and an upper side 203 which is substantially parallel to the light emission surface. The side walls of the channel are formed by the material of the optical waveguide plate 1, whereas the upper side of the channel is provided with a first layer 204 of double-sided high reflectivity.

There are two possibilities here. One possibility is that this layer 204 is provided directly on the upper side 203 of the channel 20, such that no gap or intermediate space is present between the optical waveguide plate 1 and the first layer 204. There is accordingly an optical contact between this layer and the optical waveguide plate 1, while the layer should be specularly reflecting as much as possible. It is a second, alternative, possibility that the layer 204 lies at a distance from the upper side 203 of the channel, as seen in a direction towards the interior of the channel, so that a gap arises and the layer 204, for example, may have a slight concave gradient in the direction of the light source. In this case there is no optical contact between the layer 204 and the optical waveguide plate 1, and the light from the plate is reflected back into the plate by total reflection already at the upper side 203 of the channel or at the transition surface between the material of the optical waveguide plate and the gap. Since this reflection causes only very small losses, it is generally preferred to provide some distance between the first layer 204 and the upper side 203.

The lower side of the channel, finally, is covered by a highly reflective second layer 121. This layer may be provided, for example, on a bottom wall, and preferably on the inner walls of a housing (not shown) enclosing the optical waveguide plate, such that the second reflecting layer 121 covers the entire lower side 102 and also the lateral surfaces 13 to 16, with the result that no optical contact exists with the covered surfaces from the outside.

Experiments have shown that it may be advantageous to close off the lower side of the channel 20 with an additional highly reflective layer 121a (shown with a broken line) which lies on the optical waveguide plate 1 so as to avoid in this manner that light from the channel 20 enters the gap between the optical waveguide plate 1 and the layer 121 and is directly reflected by the latter through the optical waveguide plate 1. An undesirable bright line could be caused thereby on the light emission surface 11.

A plurality of extraction elements 3 is finally present on the light emission surface 11, by means of which the light is coupled out from the optical waveguide plate 1 in a known manner.

In assembling the lighting device, the optical waveguide plate 1 is preferably accommodated in a housing with spacers 17 which are inserted between the lateral surfaces 13 to 16 of the optical waveguide plate and the inner walls of the housing as well as between the lower side 12 of the optical waveguide plate and the bottom wall of the housing. As a result of this, the second reflecting layer 121 (at the housing inner walls) is spaced away from the optical waveguide plate 1, i.e. an air gap remains between the layer 121 on the one hand and the lateral surfaces 13 to 16 and the lower side 12 on the other hand.

The light rays originating from the at least one light source 21 can enter the material of the optical waveguide plate 1 only through the side faces 201, 202 of the channel 20. They propagate in the optical waveguide plate 1 through substantially loss-free total reflections against the lateral surfaces 13 to 16 and the lower side 12 of the optical waveguide plate 1, i.e. the second layer 121 provided there, until they are coupled out through the light emission surface 11. This will be described in detail below.

If a light ray diverging in the optical waveguide plate hits the lateral walls 201, 202 of a channel 20, it will enter the latter and will be scattered inside the channel against the light source 21 and/or the highly reflective first or second layer 204; 121 (121a) before leaving the channel through the side walls 201, 202 again.

If a light ray diverging in the optical waveguide plate hits the external upper side 203 of a channel, it will either be reflected against the first layer 204, if the latter is in optical contact with the optical waveguide plate 1, or it is subjected to a total reflection against the upper side 203 if there is no optical contact with the second layer, depending on the alternative chosen as described above, so that the light ray is conducted past the channel 20 in either case.

This kind of light coupling and light divergence leads to a very homogeneous distribution of the light throughout the optical waveguide plate 1, and in particular to a very homogeneous distribution of the contributions of the individual light sources to the light coupled out at the light emission surface 11. Since the light of each light source is distributed over the entire optical waveguide plate and cannot move directly from the light sources onto the light emission surface, moreover, the influence of any individual light source, for example owing to a fluctuating intensity or a defect, will be small and hardly noticeable. These properties are improved further as the number of light sources increases.

The light may be coupled out from the light emission surface 11 of the plate 1 by means of the extraction elements 3 in a known manner, for example for illuminating a liquid crystal display or an LCD picture screen arranged on said plate. The homogeneity of the illumination can be further improved through a suitable dimensioning and/or arrangement of the extraction elements, which may also be irregular.

The optical waveguide plate 1 is preferably present in a housing (not shown) with walls which are coated with the second layer 121 and which cover the lower side 12 as well as the lateral surfaces 13 to 16, as shown in FIG. 2, such that no optical contact with the covered surfaces is possible from the outside. The second layer 121 may be mirroring or diffusely reflecting in this case.

There is also the possibility of arranging the second layer 121 directly on the relevant lateral surfaces 13 to 16 and the lower side 12, in which case the spacers 17 will be absent. This, however, has the disadvantage that part of the incident light can be directly reflected to the light emission surface 11 by the lateral surfaces, especially if the second layer is diffusely reflecting, which would lead to adverse effects. The latter may indeed be avoided to a high degree if the second layer is specularly reflecting, but such layers are substantially more expensive because they can only be manufactured with a comparable high reflectivity and provided on the surfaces of the optical waveguide plate in a very laborious manner.

It was surprisingly found here that this problem can be solved if the second layer 121 is not directly provided on the relevant lateral surfaces 13 to 16 and the lower side 12, but at a distance of, for example, 0.1 mm from the optical waveguide plate, such that there is no optical contact between the two because of an air gap. The spacers 17 are provided for this purpose.

Now when a light ray passes through one of the lateral surfaces 13 to 16 (or the lower side 12) from the optical waveguide plate 1, it is first refracted at the lateral surface, then traverses the air gap, and is reflected back by the second layer 121, which is preferably diffusely reflecting. After passing once more through the air gap, it enters the optical waveguide plate 1 again and subsequently once more complies with the conditions for total reflection, provided the refractive index of the plate is not below 1.41.

As a result of this, those components of the light which leave the optical waveguide plate through the lateral surfaces or the lower side are also reflected back again into said plate. To manufacture the second layer 121, white foils or white paints may be used which are commercially available with reflectivity values of more than 95 to 98%. It is obviously also possible to use a specularly reflecting second layer 121 at a distance from the optical waveguide plate. However, a diffusely reflecting layer has the advantage that the light after reflection is even better distributed over the optical waveguide plate and that this layer can be manufactured with higher reflectivity values and at a lower cost than a specularly reflecting layer.

A very effective coupling of light as well as a homogeneous and extremely low-loss distribution of the light from a large number of light sources are accordingly possible with this configuration.

It was further found to be advantageous to continue the highly reflective first layer 204 at the upper side 203 of the channels 20 either with a first portion 204a (shown in broken lines in FIG. 2) by a few millimeters in horizontal direction into the optical waveguide plate 1 (for this purpose the optical waveguide plate would have to be composed of two layers). Alternatively (in particular if the layer is realized by vapor deposition), the layer may be continued with a second portion 204b (shown in broken lines in FIG. 2) in a direction perpendicular thereto around the upper inner edges of the channel and along a few millimeters over the side walls in downward direction of the channel. It is avoided by either of these portions that undesirable stray light is generated at the edges of the channels.

For this purpose, furthermore, the regions of the lateral walls 201 and the lower side 12 of the optical waveguide plate 1 adjoining the opposed lower edges of the channels 20 may be provided with a highly reflective third layer 205 which extends a few millimeters along said regions.

Light sources which may be used are either cylindrical gas discharge lamps or usual optical waveguides into which the light is fed from the exterior of the optical waveguide plate. It is possible thanks to the highly effective coupling of the light into and the good distribution of the light in the plate to provide the latter with comparatively few, but therefore highly luminous light sources. This reduces the expenditure in the manufacture of the lighting device and leads to a considerable cost saving, also on account of the small number of lamps and ballast circuits required.

Figure 3:
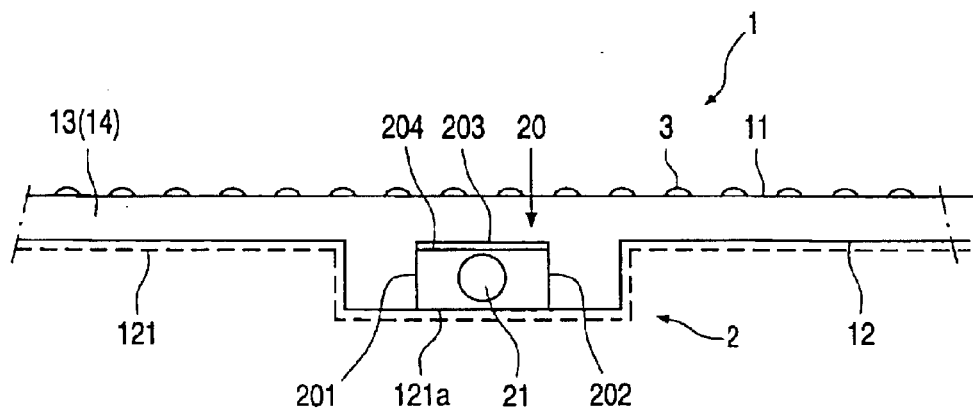
FIG. 3 is a side elevation of a second embodiment of the lighting device.

FIG. 3 shows a second embodiment of the invention in side elevation. This embodiment again comprises an optical waveguide plate 1, for example rectangular as shown in FIG. 1 with two mutually opposed long lateral surfaces 13, 14 and two mutually opposed short lateral surfaces 15, 16, or which may have some other shape as mentioned above.

In contrast to the first embodiment, the optical waveguide plate 1 comprises a plurality of optical waveguide elements 2, the channels 20 being embedded in the lower side opposite to the light emission surface 11. The elements 2, which extend substantially over the entire width of the optical waveguide plate 1, as do the channels, and which may run parallel to the short lateral surfaces, are each formed preferably by a rectangular rod which is optically fixedly connected to the lower side 12, for example by means of a glue connection thereto.

The elements 2 may in principle follow any course in the plate. Besides the preferred arrangement parallel to a long or short lateral side of the optical waveguide plate, an alternative course along the main diagonals of the plate is possible. This course may again be advantageous for an application in monitors. In addition, the elements may alternatively be arranged in a circular, oval, meandering, or some other shape.

The optical waveguide elements 2 are preferably manufactured from the same waveguide material as the other components of the optical waveguide plate 1. The number of the optical waveguide elements 2, and thus the number of the channels 20 and of the light sources 21, is chosen in dependence on the luminous intensity desired at the light emission surface 11 of the plate 1.

The same explanations given above with reference to the first embodiment are equally valid for the first reflecting layer 121 and its distance from the optical waveguide plate 1, the additional layer 121a, the second reflecting layer 204, the first and second portions 204a, 204b, the third reflecting layer 205, the shape of the channels, and the nature of the light sources.

The function of this second embodiment is basically the same as that of the first embodiment. The light radiated by the light source 21 can leave the channel 20 through its side walls 201, 202 only and is first coupled into the optical waveguide element 2. It distributes itself from the optical waveguide element 2 also into the remaining portion of the optical waveguide plate thanks to substantially loss-free total reflections against the highly reflective second layer 121 and is thus homogeneously distributed over the entire plate. The light is again coupled out from the light emission surface 11 of the plate 1 by means of extraction elements 3 in a known manner.

Experiments have shown that between approximately 70 and 80% of the lumen output from the light sources is coupled into the plate with this embodiment and becomes available at the light emission surface 11.

A further advantage of this embodiment is that further savings as to weight and space requirement can be achieved in comparison with the first embodiment. The optical waveguide elements 2, for example, have a width of a few centimeters and a height of approximately two to three times the light source diameter, while the remaining portions of the optical waveguide plate may have a thickness of approximately 5 mm.

The principle of the invention is applicable not only to linear light sources but also to point light sources such as, for example, LEDs. For this purpose, substantially cylindrical or square recesses are provided in the optical waveguide plate or the optical waveguide elements 2, as shown in FIGS. 1 to 3, instead of the channels 20, in which recesses the light sources are subsequently accommodated. Alternatively, it is also possible to realize the linear light sources in the form of a plurality of LEDs arranged in a row. In this case the LEDs are accommodated in the channels 20 at the lower side thereof.

The properties of the lighting device according to the invention as described can be utilized in a particularly advantageous manner also if the light from light sources of different colors is to be mixed in the optical waveguide plate and is to be given off as a mixed color at the light emission surface. To generate a homogeneous and even color of the mixed light, the light sources are preferably arranged such that mutually adjoining light sources always generate light of different colors.

It should be noted finally that the spacing between the reflecting second layer 121 and the lateral surfaces or lower side of the optical waveguide plate is independent of the nature, number, and positions of the light sources. The spacing may also be provided, for example, if the light sources are not arranged in the optical waveguide plate but at one or several of the lateral surfaces thereof. In this case, too, the advantages as regards a substantially loss-free reflection of the light issuing through the relevant lateral surfaces in accordance with the requirements for total reflection as described above would be obtained through such a reflecting and spaced layer at the remaining lateral surfaces.

What is claimed is:

1. A lighting device with an optical waveguide plate that has a light emission surface and a plurality of channels each for accommodating at least one substantially linear light source, wherein said channels are covered with a first reflecting layer at their upper sides facing the light emission surface, and the coupling of the light into the optical waveguide plate takes place through side walls of the channels.

2. The lighting device of claim 1, wherein the side walls of the channels extend substantially perpendicularly to the light emission surface, and the upper sides of the channels extend substantially parallel to the light emission surface.

3. A liquid crystal display including the lighting device of claim 2.

4. The lighting device of claim 1, wherein the channels are covered with a second reflecting layer at their lower sides opposite to the upper sides.

5. A liquid crystal display including the lighting device of claim 4.

6. The lighting device of claim 1, wherein the channels have a substantially rectangular cross-section.

7. A liquid crystal display including the lighting device of claim 6.

8. The lighting device of claim 1, wherein the channels are embedded in a lower side of the optical waveguide plate opposed to the light emission surface.

9. A liquid crystal display including the lighting device of claim 8.

10. The lighting device of claim 1, wherein the at least one light source is a low-pressure gas discharge lamp.

11. A liquid crystal display including the lighting device of claim 10.

12. The lighting device of claim 1, wherein the first reflecting layer has a continuation in the form of a first portion extending in horizontal direction into the optical waveguide plate.

13. A liquid crystal display including the lighting device of claim 12.

14. The lighting device of claim 1, wherein the first reflecting layer has a continuation in the form of a second portion extending along the side walls of the channels.

15. A liquid crystal display including the lighting device of claim 14.

16. A liquid crystal display including the lighting device of claim 1.

17. A liquid crystal display including a lighting device with an optical waveguide plate that has a light emission surface and a plurality of channels each for accommodating at least one substantially linear light source, wherein:
    said channels are covered with a first reflecting layer at their upper sides facing the light emission surface;
    the coupling of the light into the optical waveguide plate takes place through side walls of the channels; and
    the optical waveguide plate includes a plurality of optical waveguide elements in which the channels are provided and which are optically fixedly connected to the lower side of the optical waveguide plate opposite to the light emission surface.

18. A lighting device including an optical waveguide plate, the optical waveguide plate, comprising:
    a light emission surface; and
    a plurality of channels, each of the channels accommodating at least one substantially linear light source, wherein each channel has,
    two side walls each formed of a same material as the optical waveguide plate and each extending in a direction substantially perpendicular to the light emission surface, and
    an upper side covered with a double-sided reflecting layer, and
    wherein substantially all coupling of light from the light sources into the optical waveguide plate takes place through the side walls of the channels.

19. The lighting device of claim 18, wherein the channels are covered with a second reflecting layer at their lower sides opposite to the upper sides.

20. The lighting device of claim 18, wherein the double-sided reflecting layer has a continuation in the form of a first portion extending in horizontal direction into the optical waveguide plate.

* * * * *